United States Patent
Lee et al.

(10) Patent No.: US 8,006,078 B2
(45) Date of Patent: Aug. 23, 2011

(54) CENTRAL PROCESSING UNIT HAVING BRANCH INSTRUCTION VERIFICATION UNIT FOR SECURE PROGRAM EXECUTION

(75) Inventors: Gyung Ho Lee, Plainfield, IL (US); Tae Joon Park, Seoul (KR); Byung Chang Kang, Seongnam-si (KR); Edward Jung, Seongnam-si (KR); Yixin Shi, Oak Park, IL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 11/965,003

(22) Filed: Dec. 27, 2007

(65) Prior Publication Data

US 2008/0256346 A1    Oct. 16, 2008

Related U.S. Application Data

(60) Provisional application No. 60/907,712, filed on Apr. 13, 2007.

(30) Foreign Application Priority Data

Jun. 14, 2007 (KR) .................. 10-2007-0058604

(51) Int. Cl.
  *G06F 9/32* (2006.01)
(52) U.S. Cl. ....................................... 712/233
(58) Field of Classification Search ................. None
  See application file for complete search history.

(56) References Cited

U.S. PATENT DOCUMENTS

| | | | |
|---|---|---|---|
| 4,860,199 A * | 8/1989 | Langendorf et al. | 711/213 |
| 6,304,960 B1 | 10/2001 | Yeh | |
| 6,427,192 B1 | 7/2002 | Roberts | |
| 2002/0143799 A1 * | 10/2002 | Jourdan et al. | 707/200 |
| 2002/0194460 A1 | 12/2002 | Henry et al. | |
| 2004/0168047 A1 * | 8/2004 | Fukai et al. | 712/229 |
| 2004/0186984 A1 | 9/2004 | Williamson | |
| 2005/0146449 A1 * | 7/2005 | Adl-Tabatabai et al. | 341/51 |
| 2006/0161978 A1 * | 7/2006 | Abadi et al. | 726/22 |
| 2007/0088937 A1 * | 4/2007 | Archambault et al. | 712/239 |
| 2008/0046703 A1 * | 2/2008 | Emma et al. | 712/240 |

(Continued)

FOREIGN PATENT DOCUMENTS

JP      08-076999 A     3/1996

(Continued)

OTHER PUBLICATIONS

Zhang et al. (Zhang) (Hardware Supported Anomaly Detection: down to the Control Flow Level); Technical Report GIT-CERCS-04-11; Mar. 10, 2004; 11 pages.*

(Continued)

*Primary Examiner* — Eddie P Chan
*Assistant Examiner* — Keith Vicary
(74) *Attorney, Agent, or Firm* — Sughrue Mion, PLLC

(57) ABSTRACT

Provided are a central processing unit (CPU) and method for executing a branch instruction of a CPU, which can protect user's data by preventing an error due to a computer virus and a hacker is provided. The CPU includes: a branch instruction verification unit which verifies whether a branch instruction is valid; and a branch instruction execution unit which executes the branch instruction when the branch instruction is valid. The method includes: verifying whether the branch instruction is valid; and not executing the branch instruction when the branch instruction is invalid.

21 Claims, 15 Drawing Sheets

U.S. PATENT DOCUMENTS

2008/0184016 A1* 7/2008 Erlingsson et al. ............ 712/233

FOREIGN PATENT DOCUMENTS

| JP | 08-234980 A | 9/1996 |
| JP | 09-244892 A | 9/1997 |
| JP | 09-330220 A | 12/1997 |
| JP | 2002-189592 A | 7/2002 |
| JP | 2004-280801 A | 10/2004 |
| JP | 2005-250763 A | 9/2005 |
| KR | 10-2000-0030767 A | 6/2000 |
| KR | 10-2003-0085071 A | 11/2003 |
| KR | 10-2006-0059790 A | 6/2006 |
| WO | 2004/107706 A1 | 12/2004 |

OTHER PUBLICATIONS

Mahoney et al. (Mahoney) (Parallel Hashing Memories: an Alternative to Content Addressable Memories); IEEE-NEWCAS Conference, 2005. The 3rd International; Publication Date: Jun. 19-22, 2005; On pp. 223-226.*

Shi et al. (Shi) (Architectural Support for Run-Time Validation of Control Flow Transfer); In International Conference on Computer Design, San Jose, CA, Oct. 2006; 8 pages.*

Ramakrishna et al. (Perfect Hashing Functions for Hardware Applications); Data Engineering, 1991. Proceedings. Seventh International Conference on; Publication Date: Apr. 8-12, 1991; On pp. 464-470.*

Lee et al. (Indirect Branch Validation Unit); Microprocessors and Microsystems; vol. 33, Issues 7-8, Oct.-Nov. 2009, pp. 461-468.*

Shi et al. (Augmenting Branch Predictor to Secure Program Execution) ; IEEE/IFIP International Conference on Dependable Systems and Networks (DSN-2007), Jun. 2007; 10 pages.*

Shi et al. (Indirect Branch Validation Unit for Secure Program Execution); IEEE Symposium on Low-power and High-speed Chips (Cool Chips) Apr. 2007; 3 pages.*

Park et al. (An Efficient Hardware Support for Control Data Validation); Application -specific Systems, Architectures and Processors, 2007. ASAP. IEEE International Conf. on; Publication Date: Jul. 9-11, 2007; on pp. 409-414.*

Zhang et al. (Anomalous Path Detection with Hardware Support); Proceedings of the 2005 international conference on Compilers, architectures and synthesis for embedded systems; pp. 43-54; Year of Publication: 2005.*

Shi, et al. "Indirect Branch Validation Unit for Secure Program Execution" ECE Department, University of Illinois at Chicago, Samsung Advanced Institute of Technology, The 10th IEEE Symposium on Low Power High Speed Chips, Apr. 2007, 3pgs.

Shi, et al., "Architectural Support for Run-Time Validation of Control flow Transfer", Department of Electrical and Computer Engineering, University of Illinois at Chicago, 1-4244-9707-X/06/$20.00 ©2006 IEEE, Int. Conference Computer Design, Oct. 2006, 8pgs.

* cited by examiner

FIG. 3

| | | |
|---|---|---|
| PRESENT ADDRESS VALUE ASSOCIATED WITH FIRST BRANCH INSTRUCTION | FIRST BRANCH TARGET ADDRESS WITH RESPECT TO FIRST BRANCH INSTRUCTION | ~311 |
| | SECOND BRANCH TARGET ADDRESS WITH RESPECT TO FIRST BRANCH INSTRUCTION | ~312 |
| | THIRD BRANCH TARGET ADDRESS WITH RESPECT TO FIRST BRANCH INSTRUCTION | ~313 |
| PRESENT ADDRESS VALUE ASSOCIATED WITH SECOND BRANCH INSTRUCTION | FIRST BRANCH TARGET ADDRESS WITH RESPECT TO SECOND BRANCH INSTRUCTION | ~321 |
| | SECOND BRANCH TARGET ADDRESS WITH RESPECT TO SECOND BRANCH INSTRUCTION | ~322 |
| PRESENT ADDRESS VALUE ASSOCIATED WITH THIRD BRANCH INSTRUCTION | FIRST BRANCH TARGET ADDRESS WITH RESPECT TO THIRD BRANCH INSTRUCTION | ~331 |
| | SECOND BRANCH TARGET ADDRESS WITH RESPECT TO THIRD BRANCH INSTRUCTION | ~332 |
| | THIRD BRANCH TARGET ADDRESS WITH RESPECT TO THIRD BRANCH INSTRUCTION | ~333 |

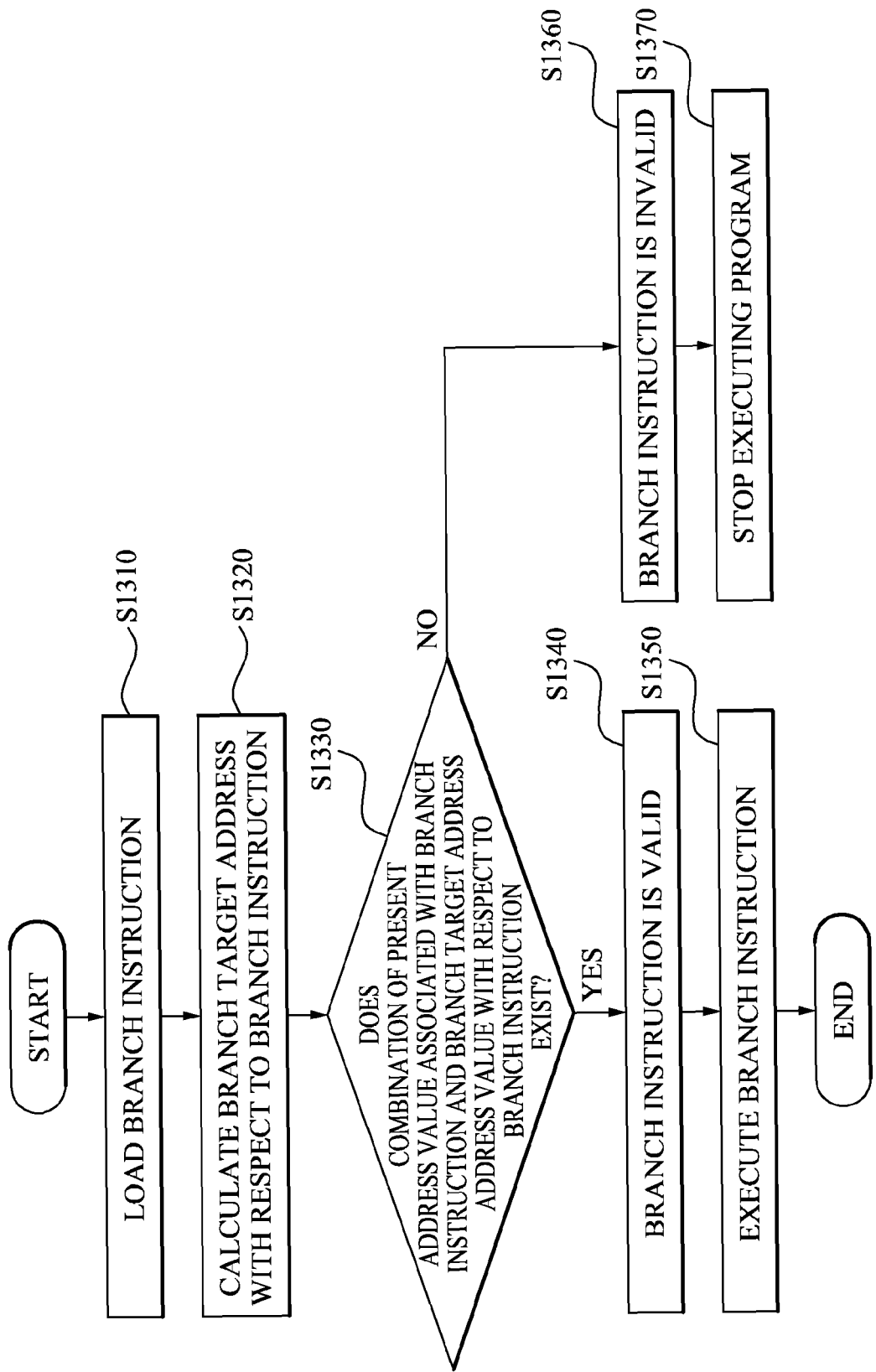

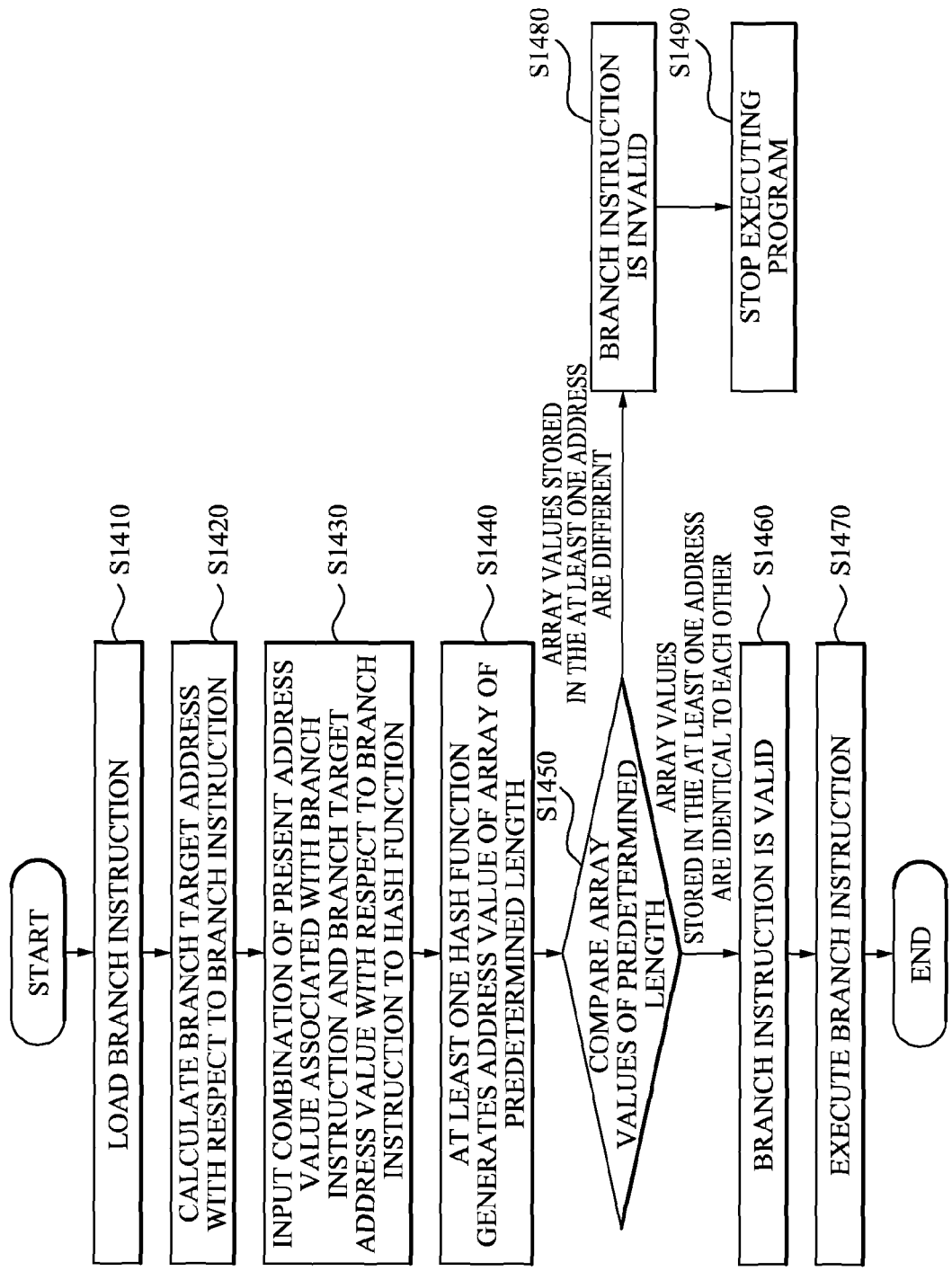

CENTRAL PROCESSING UNIT HAVING BRANCH INSTRUCTION VERIFICATION UNIT FOR SECURE PROGRAM EXECUTION

CROSS-REFERENCE TO RELATED APPLICATIONS

This application claims priority under 35 U.S.C. §119(e) from U.S. Provisional Application No. 60/907,712, filed on Apr. 13, 2007, in the U.S. Patent and Trademark Office, and under 35 U.S.C. §119(a) from Korean Patent Application No. 10-2007-0058604, filed on Jun. 14, 2007, in the Korean Intellectual Property Office, the entire disclosure of both of which are hereby incorporated by reference.

BACKGROUND OF THE INVENTION

1. Field of the Invention

Apparatuses and methods the present invention relate to preventing an error in an information processor such as a computer, a personal digital assistant (PDA), and a cellular phone, and more particularly, to verifying whether an instruction of a computer program is invalid due to a virus or hacking, when a central processing unit (CPU) embedded in the information processor executes the instruction of the computer program.

2. Description of Related Art

According to a related art technique for protecting against computer virus, samples of a computer virus, which have previously occurred, are collected, specific character strings that can be a characteristic feature of the computer virus are extracted, and whether a computer file is infected by the computer virus is verified by determining whether the specific character strings exist in the computer file.

Accordingly, once a new computer virus occurs, identification of the new computer virus is required to be acquired, character strings that may be a characteristic feature of the new virus are is required to be extracted, and a vaccine program corresponding to the new computer virus is required to be developed. Thus, protection against the new computer virus is impossible, and damage from the new computer virus cannot be prevented until after information about the new computer virus is added to a related art vaccine program. As types of a computer virus are increased, types of character strings that can be a feature of the computer virus are increased, and therefore a required time to verify whether the character string exists is increased.

When a computer receives a control flow attack from a hacker, the hacker inputs a code for executing a hacker's program into a specific address by making use of a weakness of a computer. While a general program is executed, the computer under the control flow attack branches to an address storing an instruction of the code to start the hacker's program and executes the hacker's program, the hacker thereby manipulates the computer under the control flow attack for the hacker's own purpose.

According to the related art, when the weakness of the computer program is disclosed due to the hacker's attack, a company developing the computer program can protect against the hacker's attack using a patch program having rectifying the weakness, however there is no solution against other attacks using other weaknesses which are not disclosed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides a central processing unit (CPU) capable of preventing a malicious behavior due to a computer virus without relying on a vaccine program detecting and protecting against the virus attack.

An aspect of the present invention also provides a CPU capable of protecting user's data and confidential information by preventing execution of a program inputted by a hacker.

According to an aspect of the present invention, there is provided a CPU including: a branch instruction verification unit verifying whether a branch instruction is valid; and a branch instruction execution unit executing the branch instruction when the branch instruction is valid.

According to another aspect of the present invention, there is provided a CPU including: a look up table (LUT) including a combination of an address value of at least one branch instruction and a branch target address value with respect to the branch instruction; wherein the CPU verifies the branch instruction is invalid when a combination of a present address value associated with the branch instruction and a branch target address value with respect to the branch instruction does not exist in the LUT.

According to still another aspect of the present invention, there is provided a CPU including an array of a predetermined length, generating at least one address value of the array by inputting a the combination of the present address value associated with the branch instruction and the branch target address value with respect to the branch instruction to at least one hash function, and verifying whether the branch instruction is valid based on the array values stored in the at least one address value of the array.

According to still another aspect of the present invention, there is provided a CPU including an array of a predetermined length, generating at least one address value of the array by further inputting a past branch target address with respect to branch instruction prior to the branch instruction, and verifying whether the branch instruction is valid based on the array values stored in the at least one address value of the array.

According to yet another aspect of the present invention, there is provided a method for executing a branch instruction of a CPU including: verifying whether the branch instruction is valid; and not executing the branch instruction when the branch instruction is invalid.

Additional aspects of the invention will be set forth in part in the description which follows and, in part, will be apparent from the description, or may be learned by practice of the invention.

BRIEF DESCRIPTION OF THE DRAWINGS

These and/or other aspects of the invention will become apparent and more readily appreciated from the following description of exemplary embodiments, taken in conjunction with the accompanying drawings of which:

FIG. 3 is a diagram illustrating a look up table (LUT) including a combination of a present address value associated with a presently loaded branch instruction, and a branch target address value with respect to the branch instruction according to an exemplary embodiment of the present invention;

FIG. 13 is a flowchart illustrating a method for executing a branch instruction which includes operations of verifying whether the branch instruction is valid by referring to an LUT; and FIG. 14 is a flowchart illustrating a method for executing a branch instruction which includes operations of verifying whether the branch instruction is valid using a hash function.

DETAILED DESCRIPTION OF EXEMPLARY EMBODIMENTS OF THE INVENTION

Figure 1:
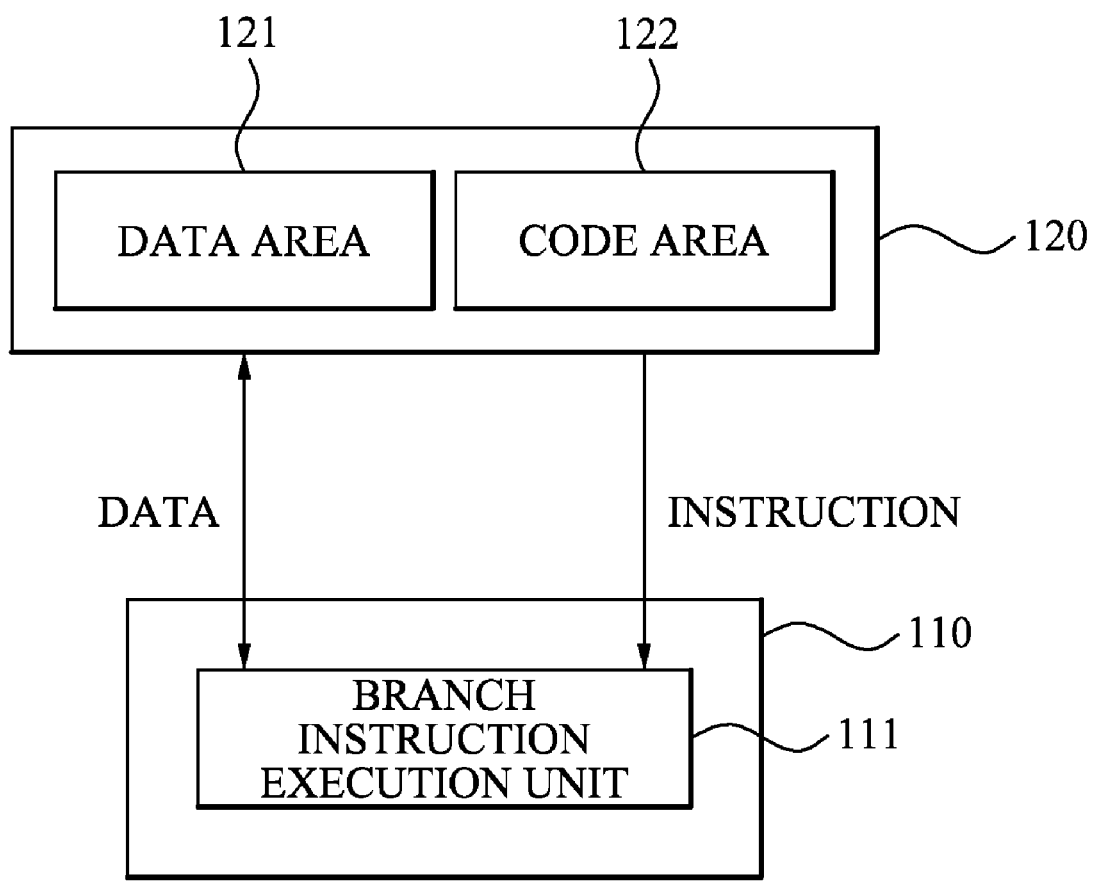
FIG. 1 is a diagram illustrating a structure of a general central processing unit (CPU) without a branch instruction verification unit.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A central processing unit (CPU) used in the specification of the present invention may indicate a device executing an instruction which is determined according to a predetermined algorithm, and include all devices performing a similar function to a CPU, a processor, and controller.

FIG. 1 is a diagram illustrating a structure of a general CPU 110 without a branch instruction verification unit. Hereinafter, execution operations of the general CPU 110 will be described by referring to FIG. 1. The CPU 110 performs a program, which is configured to output a result required by a user. The program made by a programmer goes through a compiling operation, is converted to a machine language code that can be performed by the CPU, and is stored in an outer storage unit 120. According to the exemplary embodiment of the present invention, the compiled program may be divided into a data area 121 and a code area 122 to be stored as illustrated in FIG. 1, and may be integrally stored without division.

The CPU 110 loads an instruction stored from the code area 122 of the storage unit 120. A present address value associated with the loaded instruction is stored in a program counter. The loaded instruction is stored in a type of a machine language code. The CPU 110 performs the loaded machine language code in a branch instruction execution unit 111. The CPU 110 indicates an address storing a subsequent instruction by increasing a value of the program counter storing the present address associated with the loaded instruction when the loaded instruction is a general instruction, not a branch instruction. The CPU 110 sequentially loads instructions stored from the subsequent address, and performs a predetermined task.

When the loaded instruction is a branch instruction requiring to an instruction of a specific address, the CPU 110 stores the specific address in the program counter, and loads to perform the instruction stored in the specific address in the branch instruction execution unit 111.

When the loaded instruction is an instruction determining whether to branch according to a specific variable, or when the loaded instruction is an instruction whose branch target address changes according to the specific variable, the CPU 110 verifies the specific variable, and stores the branch target address, where a next instruction is stored, in the program counter according to the verification.

The CPU 110 may store a result value in the data area 121, the result value being a result of an executed instruction of the branch instruction execution unit 111.

A computer virus or a hacker may branch to an address storing an instruction, being inserted by the computer virus or the hacker without performing an instruction stored in a branch target address by a normal programming operation, since the computer virus or hacker manipulates a specific variable determining whether to branch by using weaknesses of a computer, or manipulates the branch target address value.

Accordingly, a general instruction sequentially performs instructions stored in subsequent addresses, adjacent to an address storing a presently loaded instruction, therefore the general instruction does not require verification of whether the general instruction is valid. However, a branch instruction which is loaded to perform instructions not adjacent to the presently loaded instruction requires verification of whether the branch instruction is valid, to prevent damage due to the computer virus or hacker.

Figure 2:
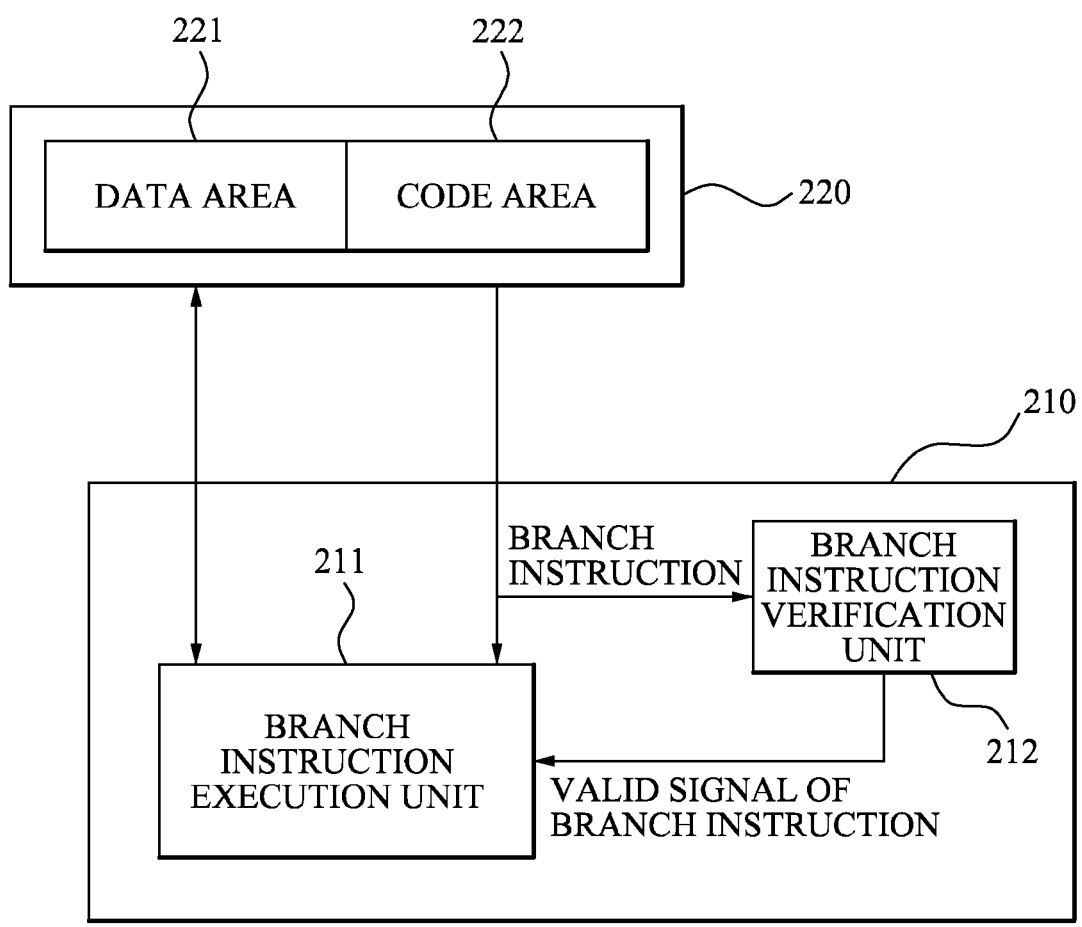
FIG. 2 is a diagram illustrating a structure of a CPU including a branch instruction verification unit according to an exemplary embodiment of the present invention.

FIG. 2 is a diagram illustrating a structure of a CPU 210 including a branch instruction verification unit 212 according to an exemplary embodiment of the present invention. Hereinafter, the structure of the CPU 210 including the branch instruction verification unit 212 will be described by referring to FIG. 2.

An outer storage unit 220 including a data area 221 and a code area 222 exists outside of the CPU 210, the data area 221 storing data used when executing a program, and the code area 222 storing instructions.

The CPU 210 loads an instruction from the code area 222 of the outer storage unit 220, when the loaded instruction is a branch instruction, and a branch instruction verification unit 212 verifies whether the loaded branch instruction is valid.

When the branch instruction verification unit 212 verifies the branch instruction is valid, the branch instruction verification unit 212 transmits a valid signal of the branch instruction to a branch instruction execution unit 211. The branch instruction execution unit 211 executes the received branch instruction. Conversely, the branch instruction execution unit 211 does not execute the branch instruction when the branch instruction execution unit 211 does not receive the valid signal of the branch instruction, or when the branch instruction execution unit 211 receives an invalid signal of the branch instruction.

According to the exemplary embodiment of the present invention, when the branch instruction verification unit 212 verifies the branch instruction is invalid, the branch instruction execution 211 unit verifies an error occurs in the branch instruction, and informs a user about the occurred error.

According to the exemplary embodiment of the present invention, the valid signal of the branch instruction may be indicated as "1", and the invalid signal of the branch instruction may be indicated as "0".

FIG. 3 is a diagram illustrating a look up table (LUT) including a combination of a present address value associated with a presently loaded branch instruction, and a branch target address value with respect to the branch instruction according to an exemplary embodiment of the present invention. Hereinafter, operations of verifying a branch instruction will be described by referring to FIG. 3.

As an example, the LUT of FIG. 3 may be stored in an embedded memory in a CPU.

When the CPU performs a branch instruction, the present address value of an outer storage unit where the branch instruction is stored and the branch target address where a subsequent instruction is stored are generated.

Generally, when a program is performed, a specific routine is repeatedly performed, or the program is branched into possible branch target addresses according to a specific variable at a specific branch point, therefore a number of the combination including the two addresses is limited.

It is assumed that the branch instruction stored in the second address is a specific branch instruction to be performed since the program branches to a first address when the specific variable A, that is, the specific branch instruction to be performed, is greater than "0", and the program is branched into a second address when the specific variable A is less than "0".

The CPU branches to the first address or the second address according to the specific variable when performing the specific branch instruction. When the present address associated with the branch instruction is identical to an address value where the specific branch instruction is stored, and when the branch target address value with respect to the branch instruction indicates a third address, the branch instruction is invalid. Accordingly, in this case, a branch instruction verification unit transmits an invalid signal of the branch instruction to a branch instruction execution unit.

Referring to the LUT of FIG. 3, regarding a present address value associated with a first branch instruction, a first branch target address 311, a second branch target address 312, and a third branch target address 313 are stored.

Also, regarding a present address value associated with a second branch instruction, a first branch target address 321, and a second branch target address 322 are stored.

Also, regarding a present address value associated with a third branch instruction, a first branch target address 331, a second branch target address 332, and a third branch target address 333 are stored.

When the present address value associated with the first branch instruction is stored in a program counter, and when a branch target address value acquired as a result of performing of the branch instruction is any one of the first branch target address 311, second branch target address 312, and third branch target address 313 with respect to the first branch instruction, the branch instruction is valid.

However, when the branch target address value acquired as a result of performing of the branch instruction is a fourth branch target address, not the first branch instruction 311, second branch instruction 312, or third branch instruction 313, the branch instruction is invalid due to a computer virus or hacking.

Accordingly, the branch instruction verification unit, by using the LUT including all the possible combinations of a present address value storing a valid branch instruction and a branch target address storing a subsequent instruction to be performed by a valid branch instruction, verifies the specific branch instruction is valid when the combination of the present address value associated with the branch instruction and the branch target address value with respect to the branch instruction exists in the LUT, and transmits a valid signal of the branch instruction to the branch instruction execution unit. When the combination of the present address value associated with the branch instruction and the branch target address value with respect to the branch instruction does not exist in the LUT, the branch instruction verification unit verifies the branch instruction is invalid, and transmits an invalid signal of the specific branch instruction to the branch instruction execution unit.

According to the exemplary embodiment of the present invention, a CPU in a device such as a computer, a personal digital assistant (PDA), and a cellular phone includes an LUT including a combination of an address value of a branch instruction to be verified and a branch target address value with respect to the branch instruction. According to the exemplary embodiment of the present invention, the LUT is stored in a memory of the CPU.

To verify whether the specific branch instruction is valid, when the combination of the address value of the branch instruction stored in the program counter and the branch target address value of the specific branch instruction does not exist in the LUT, the branch instruction verification unit verifies the specific instruction is invalid. When the specific branch instruction is invalid, the CPU does not perform the specific branch instruction.

According to the exemplary embodiment of the present invention, to more accurately perform the verification, the branch instruction verification unit may further consider a past branch instruction history executed by the CPU, including the present address value storing the branch instruction and the branch target address with respect to the branch instruction. Since the branch instruction verification unit includes the LUT including the combination of the present address value storing the branch instruction, the branch target address value with respect to the branch instruction, and the past branch instruction history executed prior to the branch instruction, the branch instruction verification unit may verify the branch instruction is valid based on the LUT when the combination exists in the LUT. When the combination does not exist in the LUT, the branch instruction verification unit may verify the branch instruction is invalid.

According to another exemplary embodiment of the present invention, the branch instruction verification unit may further consider a past branch target address being calculated by a branch instruction calculation unit with respect to branch instruction prior to the branch instruction and a branch instruction address being actually branched to by the CPU by considering the branch instruction prior to the branch instruction, and verify whether the branch instruction is valid. The branch target address which is actually branched to by the CPU is stored in a branch address history register of the CPU.

The branch instruction verification unit compares the branch target address, which is actually branched to by the CPU, with the past branch target address, which is calculated by the branch instruction calculation unit with respect to a branch instruction prior to the branch instruction, when they are different from each other, and the branch instruction verification unit verifies the branch instruction is invalid. The branch instruction verification unit may verify whether the branch instruction is valid by considering whether branch target addresses being calculated with respect to several branch instructions prior to the branch instruction are identical to branched target addresses.

Figure 4:
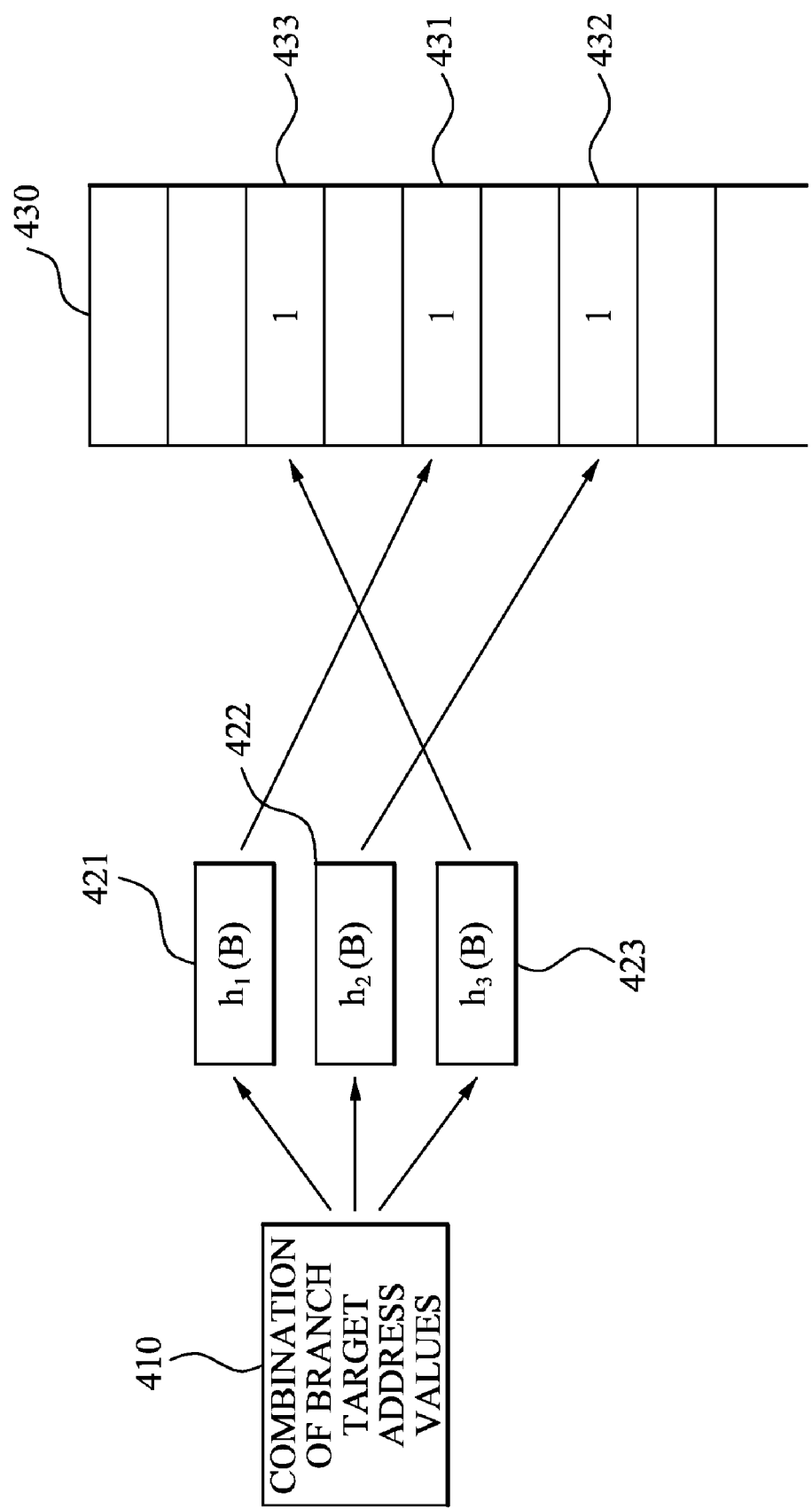
FIG. 4 is a diagram illustrating an LUT of a branch instruction verification unit which is embodied by using an array of a predetermined length according to an exemplary embodiment of the present invention.

FIG. 4 is a diagram illustrating an LUT of a branch instruction verification unit which is embodied by using an array of a predetermined length according to an exemplary embodiment of the present invention. Hereinafter, operations of verifying a branch instruction will be described by referring to FIG. 4.

A computer includes a general information processor, and a CPU of the computer processes a number of instructions, therefore an LUT of the branch instruction verification unit takes up great capacity of the computer.

When the LUT is too large, it takes a great amount of time to verify whether a combination of a present address value associated with a specific branch instruction and a branch target address with respect to the specific branch instruction exists in the LUT, thereby decreasing performance of the CPU. Also, it is difficult to design the CPU since the LUT takes up a large amount of space in the CPU.

According to the exemplary embodiment of the present invention, the LUT may be embodied using a bloom filter. The bloom filter is a type of a data structure capable of determining that a given element is included in a particular combination. The bloom filter is configured in an array of a predetermined length, reads the value stored in the array of the predetermined length using a predetermined hash function, and determines that the given element is included in the particular combination.

The bloom filter may determine an infinite number of elements included in a specific combination. However, when a number of the elements increase beyond a certain number, an error may occur and a possibility of an error occurrence increases.

A hash function is to generate a hash value by receiving predetermined data, and the received data has a different feature when the hash value is different. When a single bit of the received data changes, a hash value of and output of the hash function changes.

According to the exemplary embodiment of the present invention, the branch instruction verification unit includes an array 430 of a predetermined length, and generates at least one address value of the array 430 of the predetermined length by inputting a combination 410 of the present address value associated with the branch instruction to verify and the branch target address value with respect to the branch instruction to at least one hash function 421, 422, and 423. The branch instruction verification unit verifies whether the branch instruction is valid based on the array values 431, 432, and 433 stored in the at least one address value.

It is assumed that the combination 410 of the present address value associated with the branch instruction to verify and the branch target address value with respect to the branch instruction is simply "B".

The at least one hash function 421, 422, and 423 generates address values of the predetermined length by receiving B. In FIG. 4, a bloom filter using three hash functions 421, 422, and 423 is illustrated.

The branch instruction verification unit verifies whether the branch instruction is valid based on the array values 431, 432, and 433 stored in the address values of the predetermined length.

According to the exemplary embodiment of the present invention, when all the array values stored in the address values of the array 430 of the predetermined length are identical, the branch instruction verification unit verifies the branch instruction is valid. In FIG. 4, since all the array values stored in the three address value 431, 432, and 433 generated by the three hash functions 421, 422, and 423, and stored in the three addresses are "1", the branch instruction verification unit verifies the branch instruction is valid.

According to the exemplary embodiment of the present invention, the CPU performs a program for a predetermined time, and determines values to store for the array by examining a combination of branch instructions performed by the program.

When all the array values 431, 432, and 433 stored in the address values generated by the three hash functions 421, 422, and 423 are not identical to each other, the branch instruction verification unit verifies the branch instruction is invalid.

According to the exemplary embodiment of the present invention, the CPU of an information processor such as a computer, a PDA, and cellular phone includes an array of a predetermined length. To verify whether a specific branch instruction is valid, the CPU generates at least one address value of the array by inputting a combination of an address value with respect to a specific branch instruction and a branch target address value with respect to specific branch instruction to at least one hash function.

The CPU reads array values of the predetermined length stored in at least one address to compare the array values of the predetermined length.

According to the exemplary embodiment of the present invention, when all the array values of the predetermined length stored in at least one address are identical, the branch instruction verification unit verifies the branch instruction is valid. When all the array values stored in the at least one address of the array of the predetermined length are "1", and when the branch instruction verification unit verifies the branch instruction is valid, the branch instruction verification unit can verify by performing an AND operation with all the array values stored in at least one address.

Figure 5:
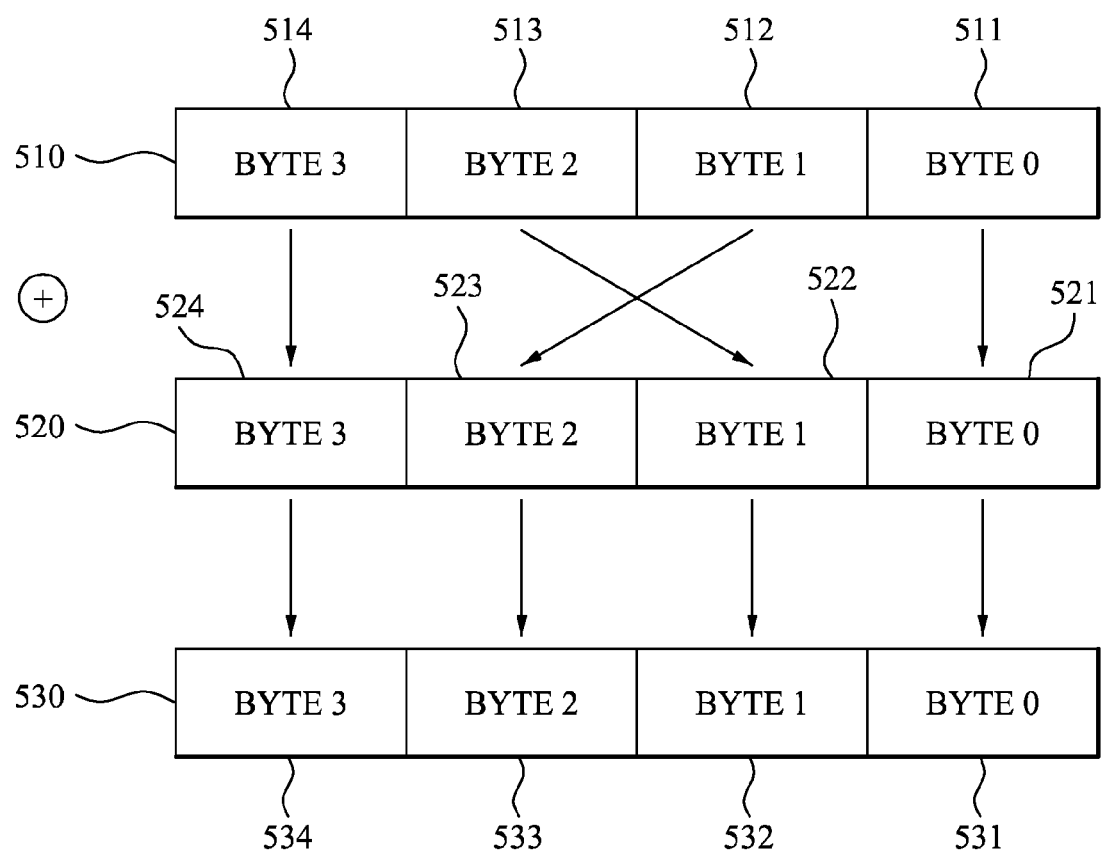
FIG. 5 is a diagram illustrating operations of a simple hash function requiring fewer calculations according to an exemplary embodiment of the present invention.

FIG. 5 is a diagram illustrating operations of a simple hash function requiring fewer calculations according to an exemplary embodiment of the present invention.

The simple hash function shuffles a bit order of a present address value 510 associated with the branch instruction, performs an exclusive OR operation with a branch target address value 520 with respect to the branch instruction, and generates an address value 530 of an array of a predetermined length.

The shuffle used in the specification of the present invention indicates scrambling orders of data stored in a specific array using a predetermined method, an order of data stored in an array prior to the shuffling becomes different from an order of data stored in an array after the shuffling.

A 32 bit CPU is assumed in FIG. 5, all the address values 510, 520, and 530 are four bytes in length The address values 510, 520, and 530 are shuffled based on a byte of an eight-bit unit in the present specification, and it is also possible to shuffle the address values 510, 520, and 530 bit by bit A first byte 531 of the address value 530 is generated by performing an exclusive OR on a first byte 511 of the address value 510 and a first byte 521 of the address value 520, a second byte 532 of the address value 530 is generated by performing an exclusive OR on a third byte 513 of the address value 510 and a second byte 522 of the address value 520, a third byte 533 of the address value 530 is generated by performing an exclusive OR on a second byte 512 of the address value 510 and a third byte 523 of the address value 520, and a fourth byte 534 of the address value 530 is generated by performing an exclusive OR with a fourth byte 514 of the address value 510 and a fourth byte 524 of the address value 520.

FIGS. 6A through 6D are diagrams illustrating various methods of simple hash functions shuffling present address values associated with a branch instruction according to another exemplary embodiment of the present invention. Hereinafter, operations of the simple hash function will be described by referring to FIGS. 6A through 6D.

Figure 6A:
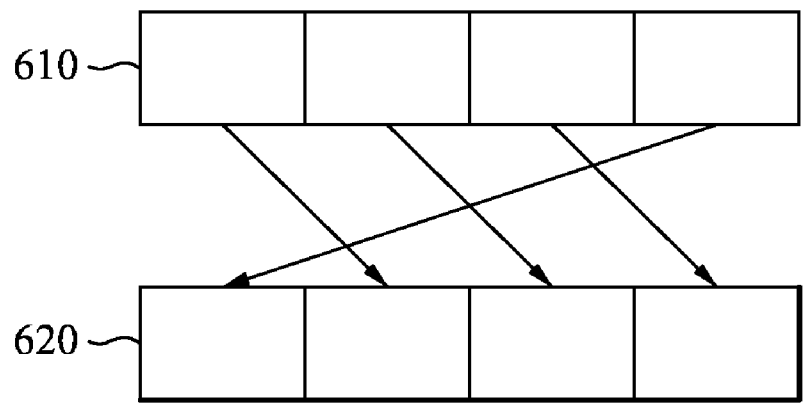
FIGS. 6A through 6D are diagrams illustrating various methods of simple hash functions shuffling present address values associated with a branch instruction according to another exemplary embodiment of the present invention.

In FIG. 6A, a hash function performs an exclusive OR operation with respect to each of first, second, third, and fourth bytes of a present address value 610 associated with a branch instruction to verify and each of fourth, first, second, and third bytes of a branch target value 620 with respect to the branch instruction, and generates fourth, first, second, and third bytes of addresses of an array of a predetermined length.

Figure 6B:
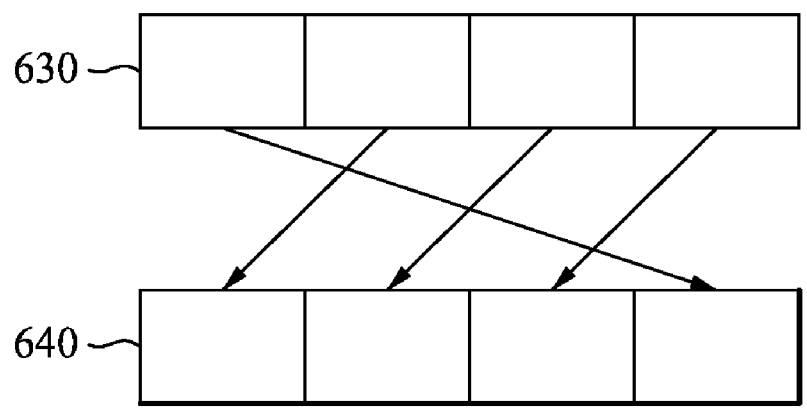

In FIG. 6B, a hash function performs an exclusive OR operation with respect to each of first, second, third, fourth bytes of a present address value 630 associated with a branch instruction to verify and each of, second, third, fourth and first bytes of a branch target value 640 with respect to the branch instruction, and generates second, third, fourth and first bytes of addresses of an array of a predetermined length.

Figure 6C:
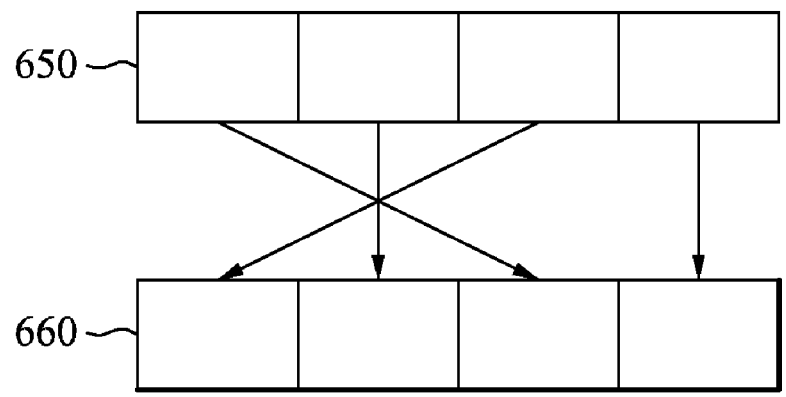

In FIG. 6C, a hash function performs an exclusive OR operation with respect to each of first, second, third, fourth bytes of a present address value 650 associated with a branch instruction to verify and each of third, second, first, and fourth bytes of a branch target value 660 with respect to the branch instruction, and generates first, fourth, third, and second bytes of addresses of an array of a predetermined length.

Figure 6D:
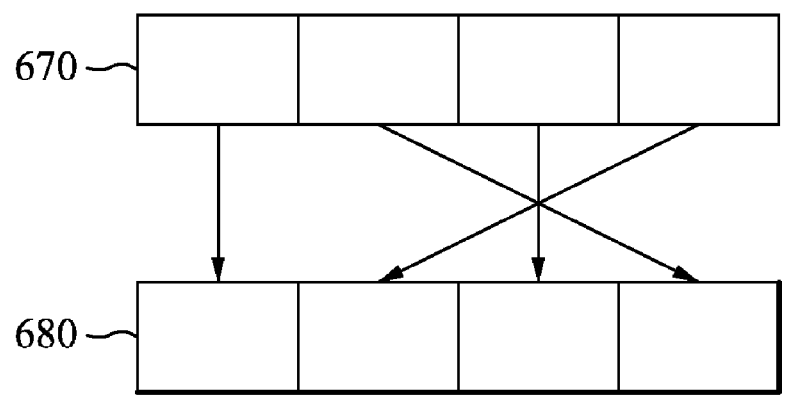

In FIG. 6D, a hash function performs an exclusive OR operation with respect to each of first, second, third, fourth bytes of a present address value 670 associated with a branch instruction to verify and each of third, second, first, and fourth bytes of a branch target value 680 with respect to the branch instruction, and generates first, fourth, third, and second bytes of addresses of an array of a predetermined length.

According to the exemplary embodiment of the present invention, the hash function used in a branch instruction verification unit uses any one of a secure hash algorithm-1 (SHA-1), a message-digest algorithm 5 (MD5), a keyed-hash message authentication code (HMAC) algorithm, and advanced encryption standard (AES).

SHA-1 is an algorithm defined within a secure hash standard (SHS) being developed by National Institute of Standards and Technology (NIST) of the United States. SHA-1, which has corrected errors existing in SHA, is a revised edition of SHA published in 1994, and is highly regarded as a superior hash function in view of cryptology. SHA-1 produces messages of less than 264 bits into compressed messages of 160 bits. SHA-1 is a well-known function to those who trained in the art, therefore further description to SHA-1 will be omitted in the specification.

AES is also known as Rijindael, and is a type of a block encryption designated as a standard of the U.S. Government. AES replaced Data Encryption Standard (DES), and a standard was published five years ago by NIST. 128, 160, 190, 224, and 256 bits is used for a size of a block in AES, and 128 bits is acknowledged as standard in the U.S. AES is a well-known function to those who trained in the art, therefore further description to AES will be omitted in the specification.

When superior hash functions such as SHA-1, MD5, HMAC, and AES are used, a possibility of an error occurrence may be greatly decreased.

Figure 7:
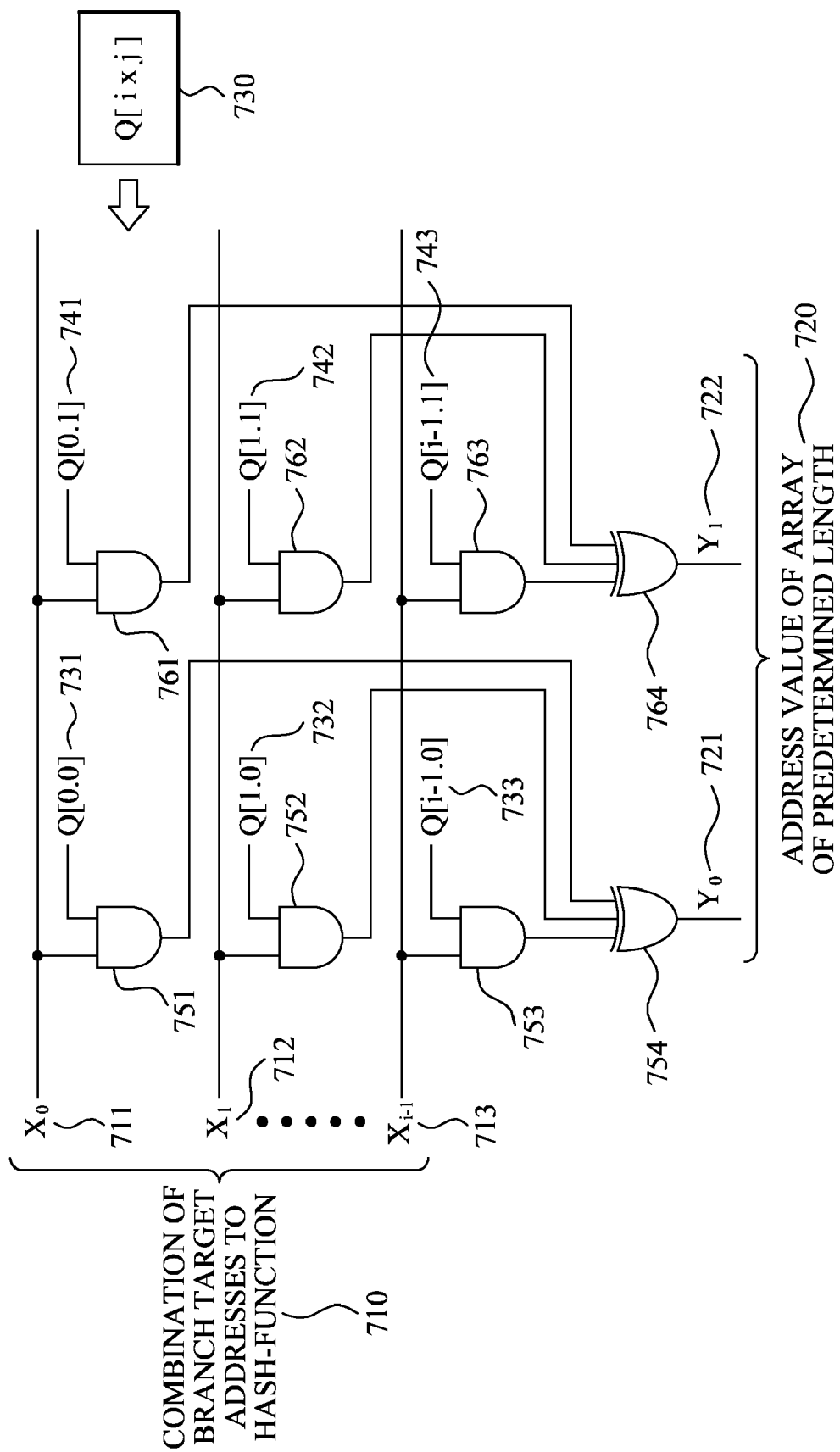
FIG. 7 is a diagram illustrating operations of an H3 hash function which uses an element value of a matrix according to an exemplary embodiment of the present invention.

FIG. 7 is a diagram illustrating operations of an H3 hash function which uses an element value of a matrix according to an exemplary embodiment of the present invention. Hereinafter, the H3 hash function will be described by referring to FIG. 7.

The H3 Hash function includes a matrix 730 including predetermined bit patterns. The H3 Hash function receives a combination 710 of a present address value associated with a branch target address to verify and the branch target address with respect to a branch instruction.

An AND operation is performed with respect to each element 751, 752, 753, 761, 762, and 763 in a specific column of the matrix 730 which corresponds to the combination 710, an exclusive OR operation is performed with respect to a plurality of values 754 and 764 being performed the AND operation, and a specific bit of an address value 720 of an array of a predetermined length is generated.

The combination 710 of the present address value associated with the branch target address to verify and the branch target address with respect to the branch instruction is an i bit length, the address value 720 of the array of the predetermined length, i.e. an output of the hash function, is a j length. The matrix 730 including the predetermined bit patterns is an i*j dimension.

When an i bit input of the hash function is X, branch instruction verification unit generates a first bit of an output value of the hash function by performing operation with respect to a first column of a matrix 730 including the predetermined bit patterns and the input bit X.

A first bit 711 among the i bit input X performs an AND operation 751 with respect to an element 731 in a first row of a first column of the matrix 730.

A second bit 712 among the i bit input X performs an AND operation 752 with respect to an element 732 in a second row of the first column of the matrix 730.

A third bit 713 among the i bit input X performs an AND operation 753 with respect to an element 733 in a third row of the first column of the matrix 730.

An exclusive OR operation 754 is performed to the results of the AND operations, and the result becomes a first bit 721 of outputs of the j-bit hash function.

A first bit 711 among the i bit input X performs an AND operation 761 with respect to an element 741 in a first row of a second column of the matrix 730.

A second bit 712 among the i bit input X performs an AND operation 742 with respect to an element 742 in a second row of the second column of the matrix 730.

A third bit 713 among the i bit input X performs an AND operation 761 with respect to an element 743 in a third row of the second column of the matrix 730.

An exclusive OR operation 764 is performed to the results of the AND operations, and the result becomes a second bit 722 of outputs of the j-bit hash function.

The above-described operations are performed until when all bit-values of the address value 720 of the j-bit hash function are acquired, consequently the address value 720 of the array of the predetermined length may be acquired using the matrix 730 including the predetermined bit patterns.

As illustrated in FIG. 7, the H3 hash function indicates a function that includes the matrix 730 including the predetermined patterns, performs a predetermined logical operation with respect to the matrix 730 and the input of the hash function, and generates the address 720 of the array of the predetermined length.

When the hash function generates the address 720 by the matrix 730 including the predetermined bit patterns it includes, and AND operations 751, 752, 753, 761, 762, and 763, and exclusive OR operations 754 and 764 are performed with respect to the matrix 730 and the input of the hash function, a function which generates a different address with respect to an identical input by changing the matrix value including the predetermined bit patterns may be easily implemented.

Figure 8:
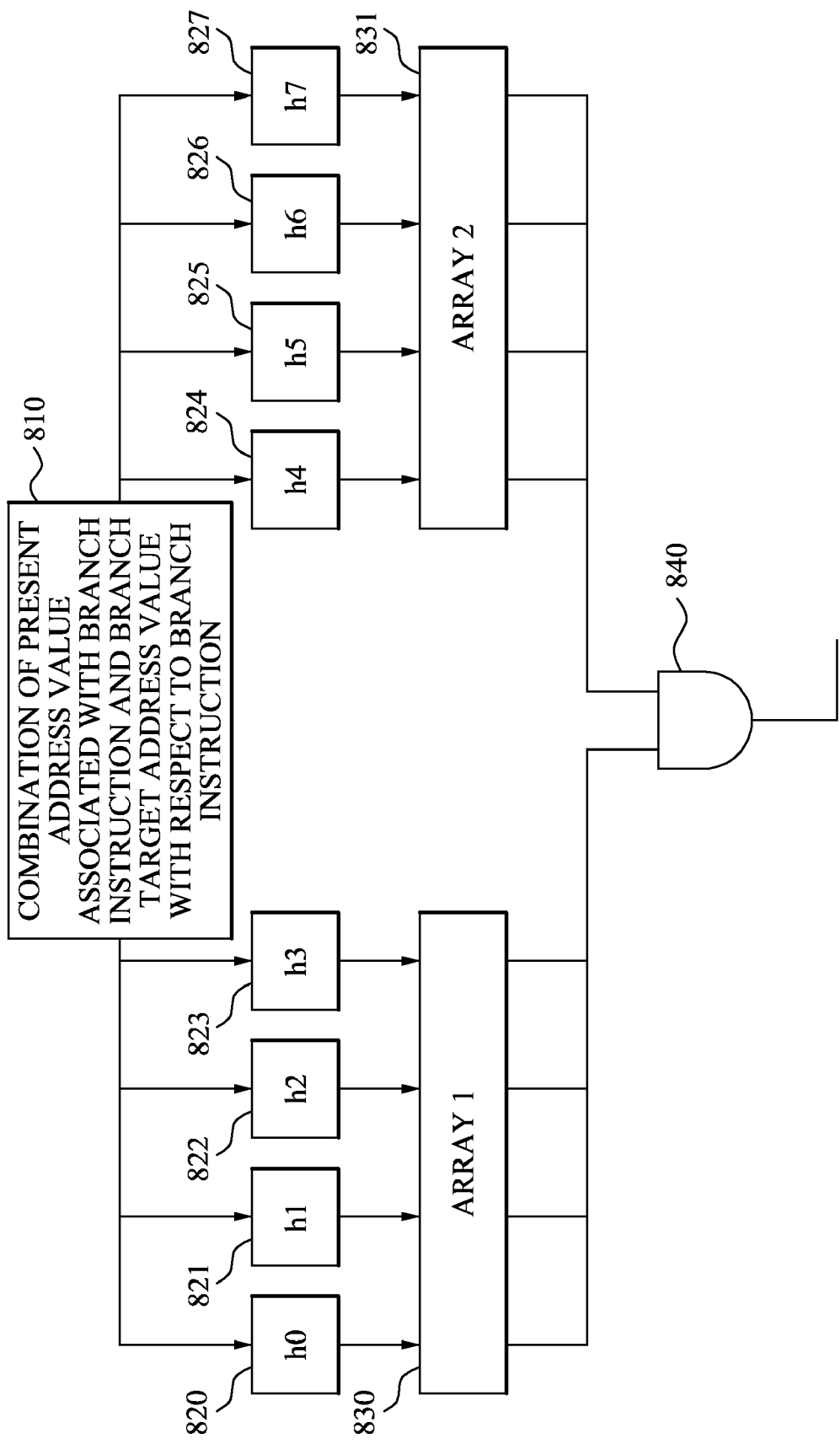
FIG. 8 is a diagram illustrating a structure of a branch instruction verification unit which is embodied by connecting two arrays in parallel according to an exemplary embodiment of the present invention.

FIG. 8 is a diagram illustrating a structure of a branch instruction verification unit which is embodied by connecting two arrays in parallel according to an exemplary embodiment of the present invention.

The branch instruction verification includes an array of a predetermined length including two arrays 830 and 831, hash functions 820, 821, 822, 823, 824, 825, 826, and 827, and a verification unit 840 verifying whether a branch instruction is valid based on values stored in the arrays of the predetermined length. A simple hash function such as SHA ("perhaps SHA-1"?), AES, and H3 may be used for the hash functions 820, 821, 822, 823, 824, 825, 826, and 827.

That is, the hash functions 820, 821, 822, 823, 824, 825, 826, and 827 are divided into a group as many as a number of the arrays 830 and 831 including the array of the predetermined length. In FIG. 8, the number of the arrays 830 and 831 including the array of the predetermined length are two, the hash functions 820, 821, 822, 823, 824, 825, 826, and 827 are divided into two groups. A first group 820, 821, 822, and 823 of the hash function generate a lower address with respect to an array 1, and a second group 824, 825, 826, and 827 of the hash function generate a lower address with respect to an array 2.

An example that the array of the predetermined length of the branch instruction verification unit consists of two arrays, is illustrated in FIG. 8, however according to another embodiment of the present invention, the array of the predetermined length the branch instruction verification unit may consist of an N numbers of arrays, and may verify whether the branch instruction is valid by dividing the hash function into the N numbers of groups.

A combination 810 of a present address value associated with a branch instruction to verify and a branch target address value with respect to the branch instruction is inputted to each of the hash functions 820, 821, 822, 823, 824, 825, 826, and 827.

The first group 820, 821, 822, and 823 of the hash function generate an address value of the first array 830, and the second group 824, 825, 826, and 827 of the hash function generate an address value of the second array 831. When all the array values of the predetermined length stored in the address values of the first array 830 and the second array 831 are identical, the branch instruction to verify is valid.

According to the exemplary embodiment of the present invention, when all the array values of the predetermined length stored in the address values of the first array 830 and the second array 831 being generated by the hash functions 820, 821, 822, 823, 824, 825, 826, and 827 are 1, an AND operation 840 is performed with respect to outputs as many as a number of the hash functions 820, 821, 822, 823, 824, 825, 826, and 827, thereby easily verifying whether the branch instruction exists in the array of the predetermined length.

Figure 9:
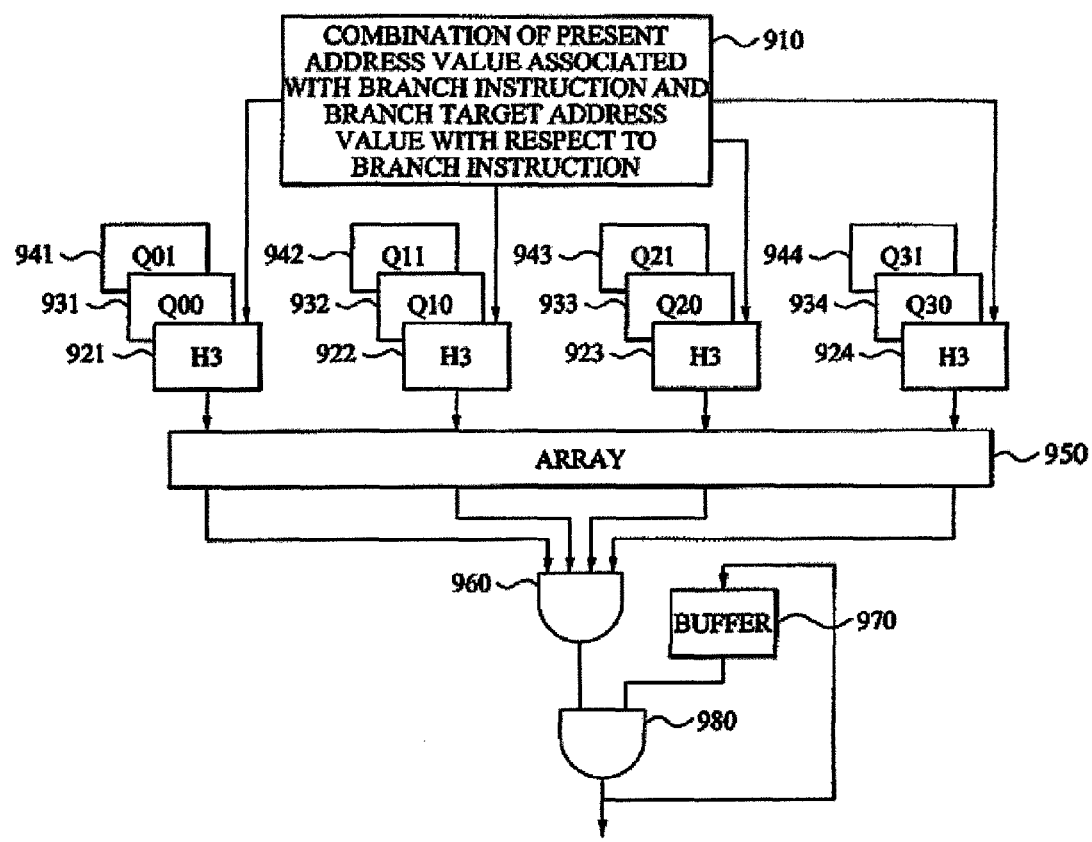
FIG. 9 is a diagram illustrating a structure of a branch instruction verification unit which verifies a branch instruction by going through sequential operations using the H3 hash function according to an exemplary embodiment of the present invention.

FIG. 9 is a diagram illustrating a structure of a branch instruction verification unit which verifies a branch instruction by going through sequential operations using the H3 hash function according to an exemplary embodiment of the present invention. Hereinafter, operations of verifying a branch instruction will be described by referring to FIG. 9.

A combination 910 of a present address value associated with a branch instruction to verify and a branch target address value with respect to the branch instruction is inputted to each of the hash functions 921, 922, 923, and 924.

Since the hash functions 921, 922, 923, and 924 uses the H3 method, each of the hash functions 921, 922, 923, and 924 respectively includes each of matrixes Q00 931, Q10 932, Q20 933, and Q30 934 including predetermined bit patterns.

The each of the hash functions 921, 922, 923, and 924 generates an address of an array 950 of the predetermined length using the matrixes Q00 931, Q10 932, Q20 933, and Q30 934 including predetermined bit patterns and the combination 910 of the present address value associated with the branch instruction to verify and the branch target address value with respect to the branch instruction.

An AND operation 960 is performed with respect to all the array values stored in the address of the array of predetermined length generated by the hash functions 921, 922, 923, and 924, and the result of the AND operation is stored in a buffer 970.

The hash functions 921, 922, 923, and 924 substitute the matrixes Q00 931, Q10 932, Q20 933, and Q30 934 including predetermined bit patterns for matrixes Q01 941, Q11 942, Q21 943, and Q31 944, and generate an address value of the array of the predetermined length using the combination 910 of the present address value associated with the branch instruction to verify and the branch target address value with respect to the branch instruction.

The AND operation 960 is performed with respect to all the array values stored in the address of the array of the predetermined length generated by the hash functions 921, 922, 923, and 924, the result is stored in the buffer 970, and the result of the AND operation is performed with respect to the result is stored in the buffer 970.

When all the array values of the predetermined length at the addresses generated by the hash functions 921, 922, 923, and 924 by using the matrixes Q00 931, Q10 932, Q20 933, and Q30 934 and all the array values of the predetermine length at the addresses generated by the hash functions 921, 922, 923, and 924 by using the matrixes Q01 941, Q11 942, Q21 943, and Q31 944 are identical as 1, the AND operation result becomes 1, thereby verifying the branch instruction is valid.

When verifying whether the branch instruction is valid, it may be possible to sequentially perform operations using four hash functions, without performing operations all at once by using the eight hash functions, thereby reducing capacity occupied by the branch instruction verification unit, and this is useful for a case, which is susceptible for a required time to verify the branch instruction. According to the exemplary embodiment of the present invention, it is possible to verify whether the branch instruction by performing operations by four times using two hash functions.

Figure 10:
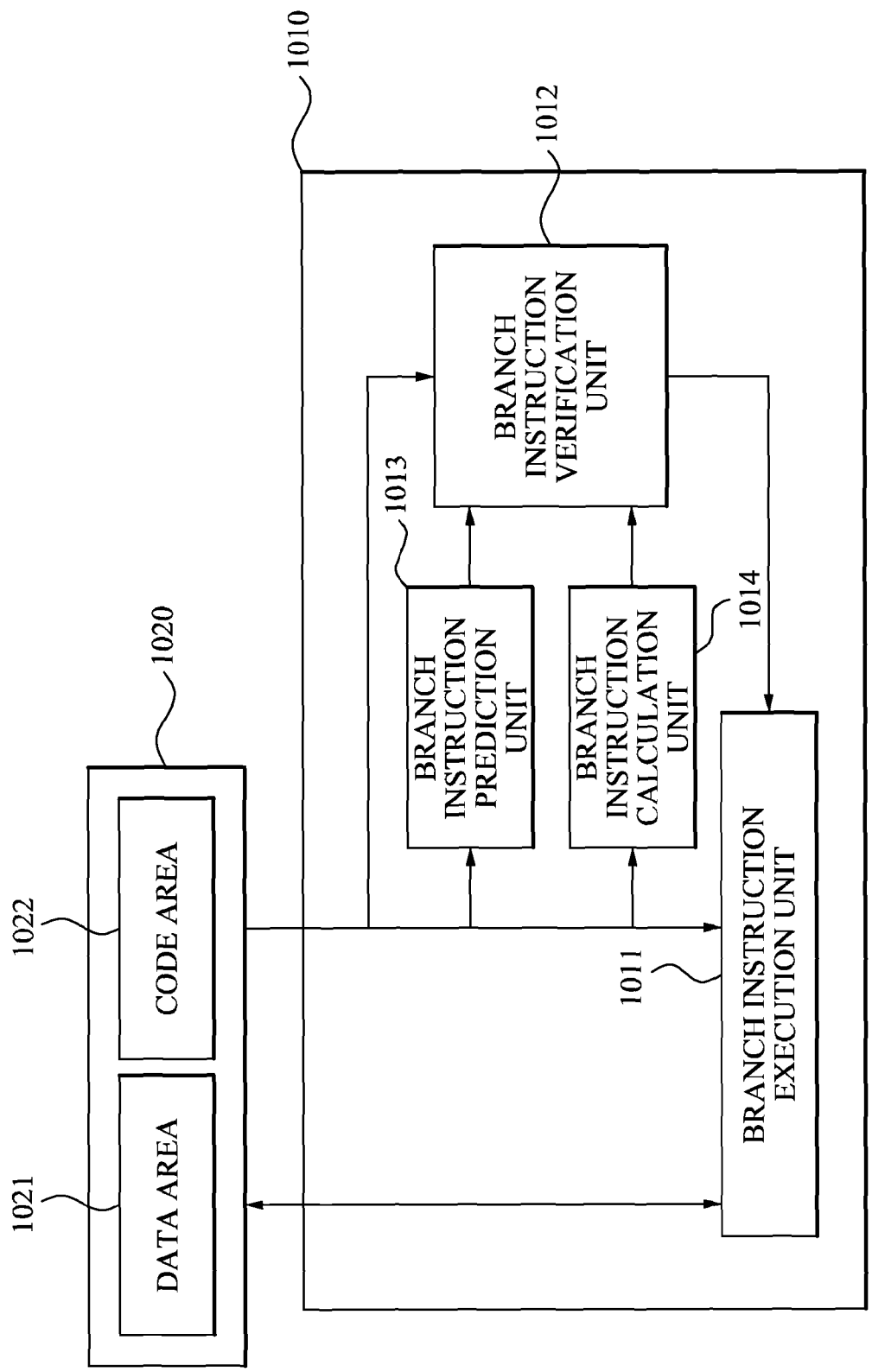
FIG. 10 is a diagram illustrating a structure of a CPU further including a branch instruction prediction unit and a branch instruction calculation unit according to an exemplary embodiment of the present invention.

FIG. 10 is a diagram illustrating a structure of a CPU 1010 further including a branch instruction prediction unit 1013 and a branch instruction calculation unit 1014 according to an exemplary embodiment of the present invention. Hereinafter, operations of verifying a branch instruction will be described by referring to FIG. 10.

An outer storage unit 1020 of the CPU 1010 is divided into a data area 1021 and a codes area 1022, and a program is stored in the outer storage unit 1020.

Since a required time to exchange data between a CPU and an outer storage unit generally takes greater than a required time to exchange data inside the CPU, in case of a branch instruction, a branch target address value, which will be branched as a result of executing the branch instruction, is predicted in the branch instruction prediction unit 1013.

A branch instruction execution unit 1011 previously loads an instruction stored in the branch target address of the outer storage unit 1020, and executes the loaded instruction.

When the branch instruction is determined to be branched by a specific variable, or when the branch target address value is changed, the branch instruction calculation unit 1014 accurately calculates the branch target address value by examining the specific variable.

When a branch target address value predicted by the branch instruction prediction unit 1013 is different from a branch target address value calculated by the branch instruction calculation unit 1014, the branch instruction execution unit 1011 disposes an executed result, previously having been loaded the branch instruction, and repeatedly loads to execute a branch instruction stored in the branch target address calculated by the branch instruction calculation unit 1014.

When a branch target address value predicted by the branch instruction prediction unit 1013 is identical to a branch target address value calculated by the branch instruction calculation unit 1014, the branch instruction execution unit 1011 stores the executed result previously having been loaded the branch instruction, and improves an execution speed of the program.

The branch instruction prediction unit 1013 predicts a branch target address with respect to the branch instruction using a static prediction method or a dynamic prediction method. Since the branch target address predicted by the branch instruction prediction unit 1013 is not infected by a computer virus or attacked a hacker, a combination of a present address value associated with the branch instruction and the branch target address value predicted by the branch instruction prediction unit 1013 is one of valid combinations regardless whether the branch target address value predicted by the branch instruction prediction unit 1013 is identical to the branch target address calculated by the branch instruction calculation unit 1014.

Accordingly, a combination of a branch instruction to verify and the branch target address predicted by the branch instruction prediction unit 1013 is a combination always existing in an LUT of the branch instruction verification unit 1012, and the branch instruction is valid.

However, when the branch target address predicted by the branch instruction prediction unit 1013 is infected by the computer virus or attacked by a hacker, and when the specific variable determining the branch target address value with respect to the branch instruction is manipulated, the branch target address predicted by the branch instruction prediction unit 1013 may be different from the branch target address calculated by the branch instruction calculation unit 1014.

Also, when a branch target address is incorrectly predicted by the branch instruction prediction unit 1013, the branch target address predicted by the branch instruction prediction unit 1013 may be different from the branch target address calculated by the branch instruction calculation unit 1014.

However, although the specific variable determining the branch target address value with respect to the branch instruction is manipulated, when the branch target address calculated by the branch instruction calculation unit 1014 is identical to the branch target address predicted by the branch instruction prediction unit 1013, a combination of the present address value associated with the branch instruction to be verified and the branch target address value calculated by the branch instruction calculation unit 1014 exists in the LUT. And the branch instruction verification unit 1012, verifies the branch instruction is valid.

Once the branch instruction is verified to be valid, the CPU may securely operate, however performance for processing the branch instruction of the CPU is deteriorated due to the required time to verify the branch instruction. The branch instruction verification unit 1012 does not operate when the branch target address predicted by the branch instruction prediction unit 1013 is identical to the branch target address calculated by the branch instruction calculation unit 1014 since the branch instruction is assumed to be valid. The branch instruction verification unit 1012 operates to verify whether the branch instruction is valid only when the branch target address predicted by the branch instruction prediction unit 1013 is different from the branch target address calculated by the branch instruction calculation unit 1014, thereby improving the performance for processing the branch instruction of the CPU.

Figure 11:
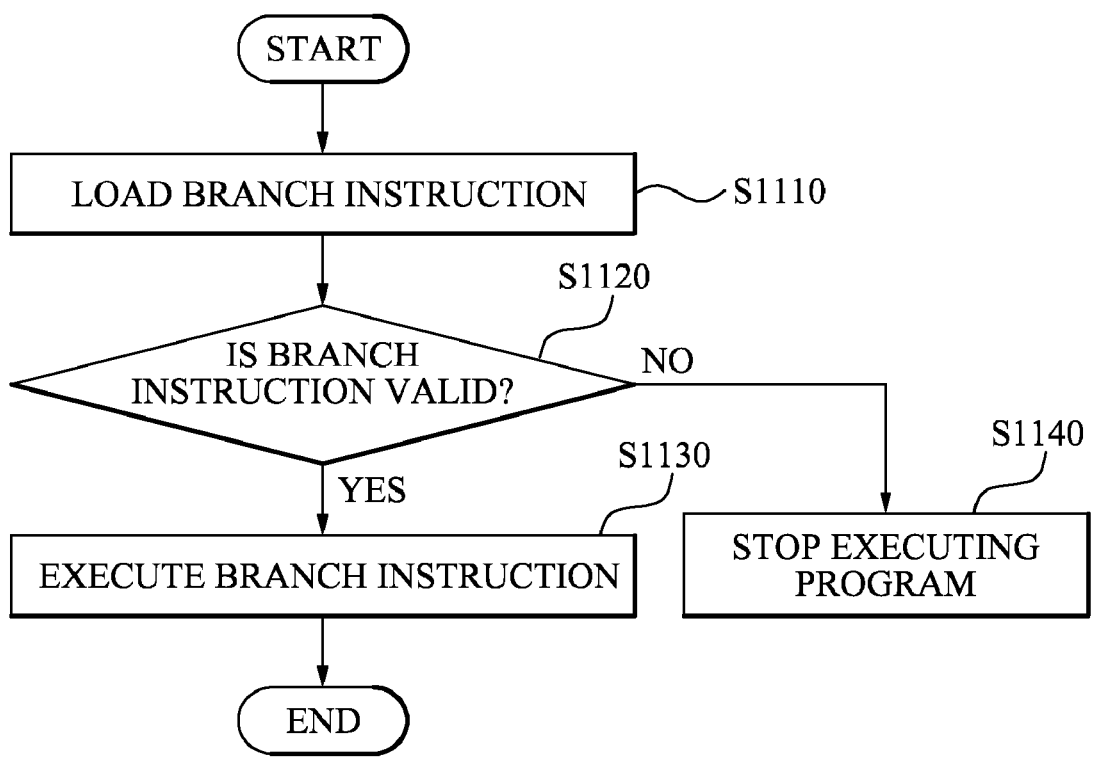
FIG. 11 is a flowchart illustrating a method for executing a branch instruction of a CPU including operations which verifies whether the branch instruction is valid.

FIG. 11 is a flowchart illustrating a method for executing a branch instruction of a CPU including operations which verifies whether the branch instruction is valid. Hereinafter, the method for executing the branch instruction of the CPU will be described by referring to FIG. 11.

In operation S1110, the CPU loads a specific branch instruction stored in an outer storage unit for performing the specific branch instruction. In this instance, an address value of the specific branch instruction is stored in a program counter of the CPU. The CPU verifies whether the loaded specific branch instruction is valid in operation S1120, and executes the loaded specific branch instruction when the loaded specific branch instruction is valid in operation S1130.

When the loaded specific branch instruction is invalid, the CPU stops executing the program since a program to be performed by the CPU is determined to be a program infected by a computer virus or attacked by a hacker in operation S1140.

According to the exemplary embodiment of the present invention, when the branch instruction is verified to be invalid in operation S1120, it is determined an error has occurred in the branch instruction, or an error occurrence may be informed to a user in operation S1140.

Figure 12:
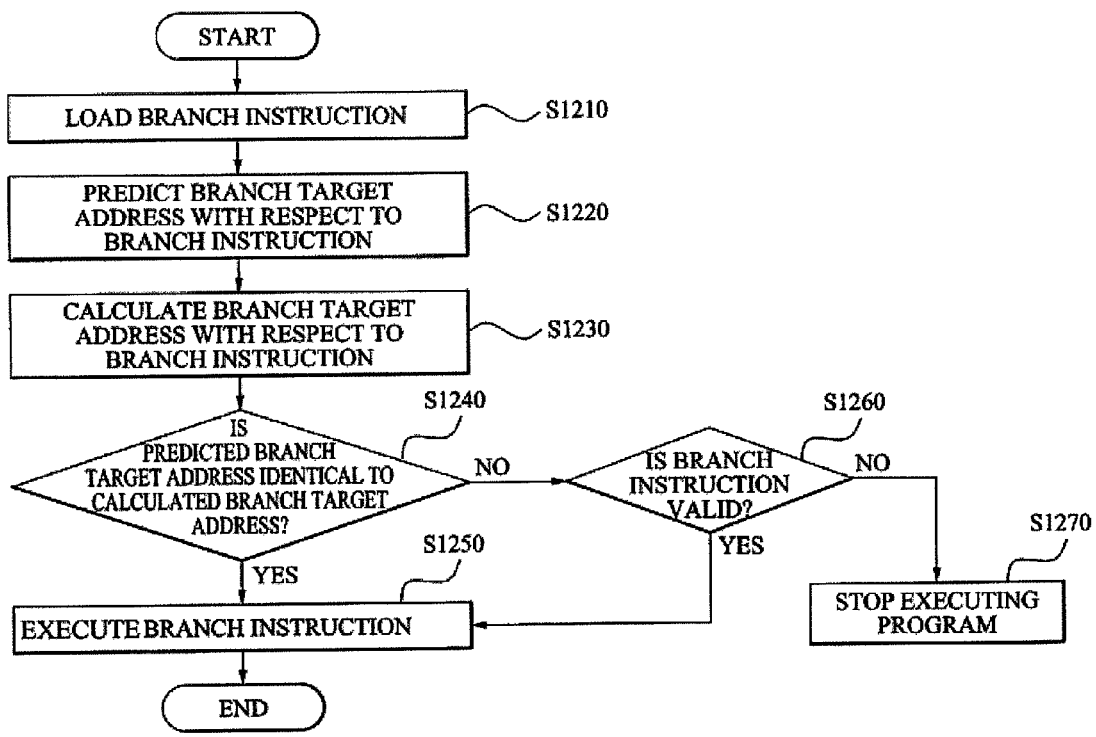
FIG. 12 is a flowchart illustrating a method for executing a branch instruction which verifies the branch instruction is valid when a branch instruction address predicted with respect to a specific branch instruction is different from a calculated branch instruction address value.

FIG. 12 is a flowchart illustrating a method for executing a branch instruction that verifies the branch instruction is valid only when a branch instruction address value predicted with respect to a specific branch instruction is different from a calculated branch instruction address value. Hereinafter, the method for executing the branch instruction will be described by referring to FIG. 12.

In operation S1210, the CPU loads a specific branch instruction stored in an outer storage unit for performing the specific branch instruction. In this instance, an address value of the specific branch instruction is stored in a program counter of the CPU. The CPU predicts a branch target address with respect to the loaded specific branch instruction in operation S1220, and calculates a branch target address with respect to the loaded specific branch instruction in operation S1230.

Since the predicted branch target address considers a past branch history, and the calculated branch target address considers a specific variable determining the branch target address value with respect to the branch instruction, the calculated branch target address is not a precise value, however the predicted calculated branch target address is a precise value. Since the specific variable determining the branch target address may be manipulated by a computer virus or a hacker, the calculated branch target address may be an address which is not associated with the branch instruction to verify, and may be an instruction inputted by the hacker. Conversely, since the predicted branch target address is one selected from branch target addresses which are possibly selected by the branch instruction to verify, there is no concern about a probability of the computer virus or the hacker.

In operation S1240, the CPU verifies whether the predicted branch target address is identical to the calculated branch target address. When the predicted branch target address is identical to the calculated branch target address, the branch instruction is valid without the probability of the computer virus or the hacker. In operation S1250, the branch instruction is executed.

When the predicted branch target address is different from the calculated branch target address, whether the branch instruction is valid is verified in operation S1260. The branch instruction is executed in operation S1250 when the branch instruction is valid, and a program performing the branch instruction is stopped in operation S1270 when the branch instruction is invalid.

FIG. 13 is a flowchart illustrating a method for executing a branch instruction which includes operations of verifying whether the branch instruction is valid by referring to an LUT. Hereinafter, the method for executing the branch instruction will be described by referring to FIG. 13.

In operation S1310, a CPU of an information processor such as a computer, a PDA, and a cellular phone loads a specific branch instruction stored in an outer storage unit. In this instance, an address value of the specific branch instruction is stored in a program counter of the CPU.

In operation S1320, the CPU calculates a branch target address with respect to the loaded specific branch instruction by considering branch conditions of the specific branch instruction.

In operation S1330, the CPU determines whether a combination of a present address value associated with the loaded branch instruction and the calculated branch target address exists in an LUT including a combination of a present address value at least one branch instruction and a branch target address value with respect to the at least one branch instruction.

When the combination of the present address value associated with the loaded branch instruction and the calculated branch target address exists in the LUT, the branch instruction is verified to be valid in operation S1340, and the branch instruction is executed in operation S1350.

When the combination of the present address value associated with the loaded branch instruction and the calculated branch target address does not exist in the LUT, the branch instruction is verified to be invalid in operation S1360, and the program performing the branch instruction is stopped in operation S1370.

FIG. 14 is a flowchart illustrating a method for executing a branch instruction which includes operations of verifying whether the branch instruction is valid using a hash function. Hereinafter, the method for executing the branch instruction will be described by referring to FIG. 14.

In operation S1410, a CPU of an information processor such as a computer, a PDA, and a cellular phone loads a specific branch instruction stored in an outer storage unit. In this instance, an address value of the specific branch instruction is stored in a program counter of the CPU.

In operation S1420, the CPU calculates a branch target address with respect to the loaded branch instruction by considering branch conditions of the loaded branch instruction.

In operation S1430, a combination of a present address value associated with the loaded branch instruction to verify and a branch target address value with respect to the loaded branch instruction is inputted to at least one hash function.

In operation S1440, the at least one hash function generates at least one address value of an array of a predetermined length.

In operation S1450, the array of the predetermined length stored in the generated at least one address is read, and the at least one address value of the array of the predetermined length are compared.

According to the exemplary embodiment of the present invention, when all the at least one address value of the array of the predetermined length stored in the at least one address are identical, the loaded branch instruction is verified to be valid in operation S1460.

When all the at least one address value of the array of the predetermined length stored in the at least one address are identical as 1, an AND operation is performed with respect to the at least one address value of the array of the predetermined length, and when the result of the AND operation is 1, consequently the loaded branch instruction may be verified to be valid.

The loaded branch instruction is executed in operation S1470 when the loaded branch instruction is valid.

When all the at least one address value of the array of the predetermined length stored in the at least one address are different in operation S1450, the loaded branch instruction is verified to be invalid in operation S1480, and a program performing the loaded branch instruction is stopped in operation S1490.

According to the above-described exemplary embodiments of the present invention, it is possible to prevent an error due to a computer virus without relying on a vaccine program detecting and curing the computer virus.

Also according to the above-described exemplary embodiments of the present invention, it is possible to protect user's data and confidential information by preventing executing a program inputted by a hacker.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A central processing unit (CPU) comprising:
    a branch instruction verification unit which verifies whether a branch instruction is valid; and
    a branch instruction execution unit which executes the branch instruction if the branch instruction is valid,
    wherein the branch instruction verification unit generates an at least one address value of an array by inputting a combination of a present address value associated with the branch instruction and a branch target address value with respect to the branch instruction to at least one hash function, and verifies the branch instruction is valid if all array values stored in the at least one address value of the array of a predetermined length are identical.

2. The CPU of claim 1, further comprising:
    a branch instruction prediction unit which predicts a branch target address value with respect to the branch instruction; and
    a branch instruction calculation unit which calculates a branch target address value with respect to the branch instruction,
    wherein the branch instruction verification unit verifies the branch instruction is valid if a predicted value of the branch target address is identical to the calculated value of the branch target address.

3. The CPU of claim 1, wherein the branch instruction verification unit verifies the branch instruction is valid based on the combination of the present address value associated with the branch instruction and the branch target address value with respect to the branch instruction.

4. The CPU of claim 3, wherein the branch instruction verification unit verifies the branch instruction is valid by further considering an instruction execution history prior to the branch instruction.

5. The CPU of claim 3, wherein the branch instruction verification unit verifies the branch instruction is valid by further considering a branch history prior to the branch instruction.

6. The CPU of claim 3, wherein the at least one hash function shuffles a bit order of the present address value associated with the branch instruction using a predetermined method, performs an exclusive OR operation with the branch target address value with respect to the branch instruction, and generates an address value of the array of predetermined length.

7. The CPU of claim 3, wherein the at least one hash function comprises a matrix comprising a predetermined bit pattern, performs an AND operation with respect to the combination and each element in a column of the matrix which corresponds to the combination, performs an exclusive OR operation with respect to a plurality of values being a result of the AND operation, and generates the address value of the array of predetermined length.

8. The CPU of claim 7, wherein the branch instruction verification unit generates a first address of the array of predetermined length using a hash function having the combination and a first matrix, stores a first value in the first address of the array in a buffer, generates a second address of the array of predetermined length using a hash function having the combination and a second matrix, and verifies the branch instruction is valid based on the first value of the array stored in the buffer and a second value stored in the second address of the array.

9. The CPU of claim 8, wherein the branch instruction verification unit verifies that the branch instruction is valid based on whether the first value of the array stored in the buffer and the second value stored in the second address of the array are identical.

10. The CPU of claim 3, wherein the at least one hash function is divided into at least one group, a predetermined area of the array of predetermined length is allocated to each of the at least one group, and the at least one hash function generates a lower address value of predetermined area allocated to a group comprising the at least one hash function.

11. A central processing unit (CPU) comprising:
an array of a predetermined length,
wherein the CPU generates at least one address value of the array by inputting a combination of an address value of a branch instruction stored in a program counter and a branch target address value with respect to a branch instruction to at least one hash function, verifies the branch instruction stored in the address value in the program counter is valid based on array values stored in the at least one address value of the array, and does not execute the branch instruction if the branch instruction is invalid.

12. The CPU of claim 11, wherein the CPU verifies the branch instruction is valid if all the array values stored in the at least one address of the array are identical.

13. The CPU of claim 11, wherein the at least one hash function shuffles bit orders of the present address value of the branch instruction using a predetermined method, performs an exclusive OR operation with the branch target address value with respect to the branch instruction, and generates an address value of the array of predetermined length.

14. The CPU of claim 11, wherein the at least one hash function comprises a matrix comprising a predetermined bit pattern, performs an AND operation with respect to the combination and each element in a column of the matrix which corresponds to the combination, performs an exclusive OR operation with respect to a plurality of values being a result of the AND operation, and generates the address value of the array of predetermined length.

15. A method for executing a branch instruction of a CPU, comprising:
verifying whether the branch instruction is valid; and
not executing the branch instruction if the branch instruction is invalid,
wherein the branch instruction is verified to be valid if all array values stored in at least one address value of an array of a predetermined length are identical, and
wherein the verifying of whether the branch instruction is valid comprises:
inputting a combination of a present address value associated with the branch instruction and a branch target address value with respect to the branch instruction to at least one hash function;
generating the at least one address value of the array of a predetermined length by the at least one hash function;
verifying whether the branch instruction is valid by comparing array values stored in the at least one address value of the array.

16. The method of claim 15, wherein the not executing of the branch instruction comprises:
determining an error occurs in the branch instruction if the branch instruction is invalid.

17. The method of claim 15, wherein the verifying of whether the branch instruction is valid comprises:
predicting a predicted value of a branch target address with respect to the branch instruction; and calculating a calculated value of the branch target address with respect to the branch instruction; and
verifying the branch instruction is valid if the predicted value of the branch target address is different from the calculated value of the branch target address.

18. The method of claim 15, wherein the verifying of whether the branch instruction is valid comprises:
storing to maintain a look up table (LUT) comprising a combination of a present address value associated with at least one branch instruction, and a branch target address value with respect to the branch instruction;
generating the branch target address with respect to the branch instruction;
verifying whether the combination of the present address value associated with at least one branch instruction and the branch target address value with respect to the branch instruction exists in the LUT; and
verifying the branch instruction is valid if the combination exists in the LUT as a result of the verification.

19. The method of claim 15, wherein the generating of the at least one address value of the array of predetermined length by the at least one hash function shuffles a bit order of the present address value associated with the branch instruction using a predetermined method, performs an exclusive OR operation with the branch target address value with respect to the branch instruction, and generates an address value of the array of predetermined length.

20. The method of claim 15, wherein the generating of the at least one address value of the array of predetermined length by the at least one hash function comprises:

performing an AND operation with respect to the combination and each element in a column of a matrix which corresponds to the combination, performs an exclusive OR operation with respect to a plurality of values being a result of the AND operation, and generates the address value of the array of predetermined length.

21. The method of claim 15, wherein the branch instruction is verified to be valid if the array values stored in the at least one address value of the array are identical.

* * * * *